Patented Apr. 1, 1952

2,591,547

UNITED STATES PATENT OFFICE 2,591,547

VULCANIZATION OF RUBBER

Rutherford B. Hill, Nitro, W. Va., assignor to Monsanto Chemical Company, St. Louis, Mo., a corporation of Delaware No Drawing. Original application September 24, 1947, Serial No. 775,959. Divided and this application September 19, 1949, Serial No. 116,613

9 Claims. (Cl. 260—785)

The present invention relates to new compositions of matter and more particularly to accelerators and curatives for the vulcanization of a rubber or a rubber containing material. In addition, the invention relates to the process of vulcanizing a rubber and to the vulcanized rubber products obtained with the aid of the new accelerators.

Thiazole sulfides are widely used accelerators in the manufacture of rubber articles. For example, 2,2' dithio bis benzothiazole is a useful accelerator but it is a high melting solid difficult to disperse in a rubber and has a very objectionable tendency to cake on the roll and adhere thereto. Lagenbeck and Rheim, Kautschuk, 12, pp. 156–159 (1936) have demonstrated that fusion of a thiazole sulfide and sulfur lowers the melting point of the former sharply. Investigation of these compositions revealed that incorporation into the rubber could be accomplished much more quickly and easily than with the pure thiazole sulfides. On the other hand, the physical properties of the fusion products from the standpoint of shipping, handling, removing from the container, etc. were so objectionable as to preclude their use as commercial accelerators. They are soft sticky pastes at room temperatures.

An object of this invention is to provide accelerating compositions which may be quickly and uniformly incorporated into a rubber. A more particular object of the invention is to provide accelerating compositions which either melt or soften during the processing of the rubber. Another object is to provide thiazole accelerators in improved physical form. A particular object is to improve the physical properties of fusion products of thiazole sulfides and sulfur. Other and further objects will in part be apparent and in part particularly pointed out in the detailed description following.

In accordance with the present invention it has been discovered that treatment of composite heat fusion products of thiazole sulfide accelerators and sulfur with a base provides low melting compositions which quickly and uniformly disperse into rubber at processing temperatures and at the same time possess satisfactory physical properties at room temperature. The base may be added prior to, during, or after the fusion.

While chemical reaction between thiazole sulfides and sulfur has been postulated, this invention is not limited to any theory of the presence or absence of chemical modifications. The accelerating properties of the fusion products are closely comparable to that which would be expected from their thiazole sulfide content.

Apparently the nature of the base employed is not critical. The alkali metal hydroxides, the alkaline earth metal hydroxides, ammonia, organic bases, preferably organic bases stronger than ammonia such as cyclohexylamine, benzyl amine, piperidine, ethyl amine, diethyl amine, methyl amine, dimethyl amine, morpholine, methyl cyclohexylamine, and the like may be used. A small amount of the base is sufficient. In general, 0.1%–1.0% based on the total weight of the composition is satisfactory. For example, 0.1% of ammonia added to a fusion mixture of equal parts by weight of sulfur and dithio bis benzothiazole gave a hard grindable product melting at 97° C. On the other hand, less than 0.1% had no noticeable effect and provided soft products which were not grindable. In most cases 0.5% by weight of the base is about the optimum concentration of base.

The proportion of sulfur can vary widely. Compositions containing less than 50% sulfur are soft and sticky and treatment with a base depresses the melting point still further; so far that they liquefy at temperatures only slightly above room temperature and therefore may be easily melted and handled as liquids. It is preferred however to employ compositions containing at least 50% sulfur. These compositions are hard grindable solids after treatment with a base although they soften and liquefy at the temperatures reached during processing of the rubber.

The table below shows the influence of varying the proportion of dithio bis benzothiazole and sulfur, either in the presence or absence of ammonia. Fusion products were prepared in which the gram atoms of sulfur per gram mol of disulfide were 16, 14, 12, 10.4, 10, 8, 6.9, 6, 4, 2.6 and 2 respectively. Fusion was carried out by heating the ingredients until a clear melt was obtained. The compositions were cooled and then placed on a steam bath and their physical condition at 95° C. noted. The preparation of the fusion products was then repeated, but in this case there was added to the melt 0.5% based on the total composition of 28% ammonium hydroxide. The fusion mixtures were then allowed to cool, their physical condition noted and their melting points determined. All of the compositions treated with ammonia and which contained at least 50% sulfur were hard friable products at room temperature.

Table I

| Dithio bis benzothiazole Per Cent | Sulfur Per Cent | Without ammonia—Physical condition of fusion product at— | | After ammonia Treatment—Physical Condition at— | |
|---|---|---|---|---|---|
| | | Room Temperature | 95° C. | Room temperature | M. P. °C. |
| 39.3 | 60.7 | soft sticky | solid liquid | hard solid | 104 |
| 42.5 | 57.5 | do | do | do | 107 |
| 46.4 | 53.6 | do | do | do | 109 |
| 50.0 | 50.0 | do | do | do | 108 |
| 51.0 | 49.0 | do | do | soft solid | 61 |
| 56.5 | 43.5 | do | do | do | 50 |
| 60.0 | 40.0 | do | solid solid-liquid | do | 46 |
| 63.4 | 36.6 | do | do | do | 47 |
| 72.2 | 27.8 | do | do | do | 43 |
| 80.0 | 20.0 | do | do | do | 44 |
| 83.8 | 16.2 | do | solid soft solid | do | 46 |

While any base appears to accelerate the hardening, there is some variation in their effectiveness. For example, equal amounts by weight of dithio bis benzothiazole and sulfur were heated to form a clear melt and then treated with 0.25% based on the total combined weight of the following bases. The compositions were then cooled and their physical properties noted.

Table II

| Base | Condition after cooling |
|---|---|
| None | soft sticky. |
| NaOH | soft, becoming hard and brittle after 48 hours. |
| NH₃ | hard and brittle. |
| Piperidine | Do. |
| Cyclohexylamine | Do. |

Into a container of suitable capacity fitted with an agitator there was charged 125 pounds of sulfur. The sulfur was melted and then 125 pounds of 2,2' dithio bis benzothiazole was added at 110°–112° C. over a period of about 40 minutes while stirring. The mixture was then heated to 148° C. and 5 pounds of a 25% aqueous caustic soda solution added gradually. The temperature dropped to 124° C. as the water evaporated but was then gradually brought up to 138° C. About 50 minutes was required for the addition of the caustic and heating to 138° C. The melt was then poured out into pans and allowed to cool. After 18 hours the material had hardened considerably and after 48 hours was hard and brittle so that it could be finely pulverized. The pulverized product is identified as Accelerator A in the stock below.

Stocks were compounded comprising:

| Stock | Part by weight | |
|---|---|---|
| | 1 | 2 |
| G R-S rubber | 100 | 100 |
| Carbon black | 40 | 40 |
| Zinc oxide | 3 | 3 |
| Sulfur | 2.0 | 0.5 |
| Dithio bis benzothiazole | 1.5 | |
| Accelerator A | | 3.0 |

The stocks so compounded were vulcanized by heating in a press for different periods of time at 142° C. The physical properties of the cured products are set forth in the table following.

Table III

| Stock | Cure Time in Mins. | Modulus of Elasticity in lbs./in.² at elongations of— | | Tensile at Break in lbs./in.² | Ultimate Elongation Per Cent |
|---|---|---|---|---|---|
| | | 300% | 500% | | |
| 1 | 15 | 90 | 123 | 186 | 850 |
| 2 | 15 | 156 | 196 | 243 | 596 |
| 1 | 30 | 283 | 523 | 680 | 720 |
| 2 | 30 | 310 | 625 | 915 | 740 |
| 1 | 45 | 503 | 1,013 | 1,260 | 580 |
| 2 | 45 | 453 | 986 | 1,600 | 730 |
| 1 | 60 | 666 | 1,370 | 1,520 | 563 |
| 2 | 60 | 630 | 1,386 | 1,993 | 683 |

Stocks were compounded comprising:

| Stock | Part by weight | |
|---|---|---|
| | 3 | 4 |
| Smoked sheet rubber | 100 | 100 |
| Zinc oxide | 5 | 5 |
| Carbon black | 45 | 45 |
| Stearic acid | 3 | 3 |
| Hydrocarbon softener | 3 | 3 |
| Sulfur | 3 | 2.55 |
| N-cyclohexyl 2-benzothiazole sulfenamide | 0.3 | 0.3 |
| 2,2' dithio bis benzothiazole | 0.45 | |
| Accelerator A | | 0.9 |

The stocks were milled at 95° C. at which temperature Accelerator A softened and dispersed readily into the rubber whereas 2,2' dithio bis benzothiazole tended to cake on the rolls instead of going into the rubber. The compounded stocks were cured in the usual manner by heating in a press for different periods of time at 144.5° C. The physical properties of the cured rubber products are set forth below:

Table IV

| Stock | Cure Time in Mins. | Modulus of Elasticity in lbs./in.² at elongations of— | | Tensile at Break in lbs./in.² | Ultimate Elongation Per Cent |
|---|---|---|---|---|---|
| | | 300% | 500% | | |
| 3 | 15 | 1,060 | 2,430 | 3,840 | 690 |
| 4 | 15 | 945 | 2,400 | 4,110 | 705 |
| 3 | 30 | 1,450 | 3,240 | 4,480 | 650 |
| 4 | 30 | 1,420 | 3,180 | 4,640 | 650 |
| 3 | 45 | 1,595 | 3,380 | 4,350 | 600 |
| 4 | 45 | 1,540 | 3,440 | 4,360 | 610 |
| 3 | 60 | 1,700 | 3,600 | 4,220 | 570 |
| 4 | 60 | 1,665 | 3,360 | 4,240 | 600 |

Into a container of suitable capacity there was charged 39.3 parts by weight of 2,2' dithio bis benzothiazole and 60.7 parts by weight of sulfur. The mixture was heated until a clear melt was formed and then 0.5 part by weight of 28% ammonium hydroxide added, and the melt allowed to cool to room temperature. A hard grindable solid was formed designated as Accelerator B in the following stocks:

| Stock | Part by weight | |
|---|---|---|
| | 5 | 6 |
| GR-S rubber | 100 | 100 |
| Carbon black | 40 | 40 |
| Zinc oxide | 3 | 3 |
| Hydrocarbon softener | 8 | 8 |
| Sulfur | 2.22 | 0.5 |
| 2,2' dithio bis benzothiazole | 1.18 | |
| Accelerator B | | 3.0 |

Accelerator B melted on the bank of the stock during mixing. The compounded stocks were cured by heating in the usual manner for different periods of time at 142° C. The physical properties of the cured products are set forth below:

Table V

| Stock | Cure Time in Mins. | Modulus of Elasticity in lbs./in.² at elongations of— | | Tensile at Break in lbs./in.² | Ultimate Elongation Per Cent |
|---|---|---|---|---|---|
| | | 300% | 500% | | |
| 5 | 15 | (¹) | (¹) | | |
| 6 | 15 | (¹) | (¹) | | |
| 5 | 30 | 73 | 78 | 153 | 946 |
| 6 | 30 | 66 | 75 | 156 | 1,006 |
| 5 | 45 | 93 | 250 | 743 | 956 |
| 6 | 45 | 85 | 273 | 691 | 926 |
| 5 | 60 | 115 | 395 | 1,271 | 946 |
| 6 | 60 | 160 | 476 | 1,165 | 870 |

¹ No cure.

The accelerating compositions of this invention are useful in the vulcanization of sulfur vulcanizable rubbery materials generally. Suitable rubbers comprise india rubber, reclaimed rubber, balata, gutta percha, butadiene-1,3 polymer, copolymer of butadiene-1,3 and styrene, copolymer of butadiene-1,3 and acrylonitrile, and other sulfur vulcanizable rubbery products whether natural or synthetic.

The present invention is not limited to the specific examples herein set forth of the preparation and use of the preferred accelerators. The procedure for the preparation of the fusion products may be varied as will be apparent to those skilled in the art to which the invention pertains. While the use of the new accelerators has been described by references to particular formulations, other ratios of the compounding ingredients than those mentioned in the examples as well as other well known fillers, pigments, and the like may be employed in the production of various types of rubber compounds. Where desired basic activating accelerators may be employed in conjunction with the fusion products, as for example diphenyl guanidine, di-o-tolyl guanidine, thiocarbanilide, hexamethylene tetramine, para phenylene diamine, anhydro formaldehyde aniline, diphenyl guanidine phthalate, triphenyl guanidine, butylaldehyde aniline, dibutyl amine oleate and dicyclohexylamine oleate.

While sulfur may be added in addition to that present in the fusion product, the ratios in which the sulfur and accelerator are fused may be varied so as to avoid the independent addition of either ingredient. For example, in compounding a stock calling for 3 parts of sulfur and 1 part of 2,2' dithio bis benzothiazole, the sulfur and accelerator may with advantage be replaced by 4 parts of a fusion mixture of 3 parts of sulfur and 1 part of 2,2' dithio bis benzothiazole treated with a base as described herein. Thus, the invention contemplates replacing the usual sulfur and thiazole sulfide combinations with preformed composite fusion products fused in any of the ratios these ingredients are separately employed.

Instead of 2,2' dithio bis benzothiazole other thiazole sulfide accelerators may be fused with sulfur, as for example 2,2'-dithio bis 4,5-dimethyl thiazole, 2,2'-dithio bis 4-ethyl thiazole, 2,2'-dithio bis 4-phenylbenzothiazole, 2,2'-dithio bis methylbenzothiazole, 2,2'-dithio bis 6-phenylbenzothiazole and 2,2'-dithio bis chlorobenzothiazole.

This invention is a division of co-pending application Serial No. 775,959, filed September 24, 1947, now Patent No. 2,567,710, issued on September 11, 1951, and is limited solely by the claims attached hereto as part of the present specification.

What is claimed is:

1. The process of vulcanizing a sulfur vulcanizable rubber which comprises heating the rubber having incorporated therein a composition prepared by treating with 0.1%–1.0% by weight based on the total composition of a base the composite heat fusion product of a 2,2'-dithio bis thiazole and sulfur containing from 2 to 16 atomic weight proportions of sulfur per molecular proportion of said thiazole.

2. The process of vulcanizing a sulfur vulcanizable rubber which comprises heating the rubber having incorporated therein a small amount of a composition prepared by treating with 0.1%–1.0% by weight based on the total composition of a base the composite heat fusion product of a 2,2'-dithio bis arylenethiazole accelerator and sulfur containing from 2 to 16 atomic weight proportions of sulfur per molecular proportion of said thiazole.

3. The process of vulcanizing a sulfur vulcanizable rubber which comprises heating the rubber having incorporated therein a small amount of a composition prepared by treating with 0.1%–1.0% by weight based on the total composition of a base the composite heat fusion product of 2,2'-dithio bis benzothiazole and sulfur containing from 2 to 16 atomic weight proportions of sulfur per molecular proportion of said thiazole.

4. The process of vulcanizing a sulfur vulcanizable rubber which comprises heating the rubber having incorporated therein a small amount of a composition prepared by treating with 0.1%–1.0% by weight based on the total composition of a metal hydroxide the composite heat fusion product of 2,2'-dithio bis benzothiazole and sulfur, the proportion of sulfur by weight being at least equal to that of the 2,2'-dithio bis benzothiazole but not more than about 60.7% of the total composition.

5. The process of vulcanizing a sulfur vulcanizable rubber which comprises heating the rubber having incorporated therein a small amount of a composition prepared by treating with 0.1%–1.0% by weight based on the total composition of an alkali metal hydroxide the composite heat fusion product of 2,2'-dithio bis benzothiazole and sulfur containing from 2 to 16 atomic weight proportions of sulfur per molecular proportion of said thiazole.

6. The process of vulcanizing a sulfur vulcanizable rubber which comprises heating the rubber having incorporated therein a small amount of a composition prepared by treating with 0.1%–1.0% by weight based on the total composition of ammonia the composite heat fusion product of 2,2'-dithio bis benzothiazole and sulfur, the proportion of sulfur by weight being at least equal to that of the 2,2'-dithio bis benzothiazole.

7. The process of vulcanizing a sulfur vulcanizable rubber which comprises heating the rubber having incorporated therein a small amount of a composition prepared by treating with 0.1%–1.0% by weight based on the total composition of an organic base the composite heat fusion product of 2,2'-dithio bis benzothiazole and sulfur containing from 2 to 16 atomic weight proportions of sulfur per molecular proportion of said thiazole.

8. The process of vulcanizing a sulfur vulcanizable rubber which comprises heating the rubber having incorporated therein a small amount of a composition prepared by treating with 0.1%–1.0% by weight based on the total composition of an amine stronger than ammonia the composite heat fusion product of 2,2'-dithio bis benzothiazole and sulfur, the proportion of sulfur by weight being at least equal to that of the 2,2'-dithio bis benzothiazole but not more than about 60.7% of the total composition.

9. The process of vulcanizing a sulfur vulcanizable rubber which comprises heating the rubber having incorporated therein a small amount of a composition prepared by treating with 0.1%–1.0% by weight based on the total composition of a base the composite heat fusion product of substantially equal proportions by weight of 2,2'-dithio bis benzothiazole and sulfur.

RUTHERFORD B. HILL.

REFERENCES CITED

The following references are of record in the file of this patent:

UNITED STATES PATENTS

| Number | Name | Date |
|---|---|---|
| 1,544,687 | Sebrell | July 7, 1925 |
| 1,926,740 | Clapson et al. | Sept. 12, 1933 |
| 2,087,200 | Clifford | July 13, 1937 |

OTHER REFERENCES

"Kautschuk," vol. 12 of 1936, pages 156–159